(12) United States Patent
Ohta

(10) Patent No.: US 7,566,843 B2
(45) Date of Patent: Jul. 28, 2009

(54) WIRE INSERTING METHOD AND WIRE INSERTING APPARATUS IN WIRE DISCHARGE PROCESSING

(75) Inventor: Mitsuo Ohta, Nishio (JP)

(73) Assignee: Denso Corporation, Kariya (JP)

( * ) Notice: Subject to any disclaimer, the term of this patent is extended or adjusted under 35 U.S.C. 154(b) by 423 days.

(21) Appl. No.: 11/035,333

(22) Filed: Jan. 13, 2005

(65) Prior Publication Data
US 2005/0160595 A1 Jul. 28, 2005

(30) Foreign Application Priority Data
Jan. 22, 2004 (JP) .................. 2004-014548

(51) Int. Cl.
*B23H 7/10* (2006.01)
(52) U.S. Cl. .............. 219/69.12; 29/825; 29/746; 219/69.17; 219/69.19
(58) Field of Classification Search .......... 29/825, 29/868, 840, 842–843, 753, 564.4, 33 F; 219/69.12, 69.15, 69.17; 65/105; 600/377
See application file for complete search history.

(56) References Cited

U.S. PATENT DOCUMENTS

| 4,467,972 | A | * | 8/1984 | Kaiser .................. 242/434.7 |
| 4,598,189 | A | * | 7/1986 | Inoue et al. .............. 219/69.12 |
| 4,990,738 | A | * | 2/1991 | Taneda .................... 219/69.12 |
| 5,006,692 | A | | 4/1991 | Magara et al. |
| 5,130,508 | A | * | 7/1992 | Umetsu et al. ........... 219/69.12 |
| 6,201,205 | B1 | * | 3/2001 | Oshio ..................... 219/69.12 |
| 6,602,561 | B1 | * | 8/2003 | Moro et al. ................ 427/580 |

FOREIGN PATENT DOCUMENTS

| JP | 59-205230 A | 11/1984 |
| JP | 60-104619 A | 6/1985 |
| JP | 60-108227 A | 6/1985 |
| JP | 4-71647 | 11/1992 |

OTHER PUBLICATIONS

Search Report dated Jul. 7, 2006 form co-pending Chinese application No. 200510004758.3.
Front sheet of Chinese Patent Publication No. 1331631 dated Aug. 15, 2007.

* cited by examiner

*Primary Examiner*—Minh Trinh
(74) *Attorney, Agent, or Firm*—Harness, Dickey & Pierce, PLC (57) ABSTRACT

A wire inserting method comprises a pipe inserting step of inserting one pipe (5) into all through-holes (11) under the state where the plurality of through-holes (11) are arranged on the same axis, a wire inserting step carried out after, or in parallel with, the pipe inserting step, for inserting the electrode wire (2) through the pipe (5), and a pipe removing step of pulling out only the pipe (5) from the through-holes (11) after the wire insertion step.

18 Claims, 6 Drawing Sheets

WIRE INSERTING METHOD AND WIRE INSERTING APPARATUS IN WIRE DISCHARGE PROCESSING

BACKGROUND OF THE INVENTION

1. Field of the Invention

This invention relates to a wire inserting method and a wire inserting apparatus in a wire discharge processing. More particularly, the invention relates to a wire inserting method and a wire inserting apparatus that can reliably insert a wire into a plurality of through-holes of a workpiece or workpieces (object to be processed).

2. Description of the Related Art

Wire discharge processing is a technology that arranges a workpiece or workpieces (object to be processed) and an electrode wire in such a manner as to oppose each other with a very small gap between them, applies electric power between them to generate discharge in the very small gap and conducts a precision processing of the workpiece by discharge energy. The wire discharge processing is employed to form an odd-shaped through-hole in a workpiece, for example.

When the wire discharge processing is executed by inserting the electrode wire through the through-hole formed in advance in the workpiece, a wire inserting method is known in the past that jets a liquid such as water to the through-hole and guides and inserts the electrode wire into the through-hole while the electrode wire is carried by this liquid jet stream (Japanese Patent Kokoku No. 04-71647).

However, the method utilizing the liquid jet is not yet free from the following problems. In other words, when one workpiece has a plurality of through-holes or when the electrode wire is inserted through all the through-holes of a plurality of workpieces, positioning of the liquid jetting direction becomes more difficult when the gap between the first through-hole and the last through-hole is greater and when the diameter of the through-holes is smaller. Consequently, the liquid jet is more likely to scatter around the through-holes at the intermediate part due to even a slight positioning error, and it becomes difficult to reliably insert the electrode wire through all the through-holes.

SUMMARY OF THE INVENTION

The invention aims at providing a wire inserting method and a wire inserting apparatus in a wire discharge processing that solve the problems of the prior art technology described above and can reliably insert an electrode wire through all the through-holes even when a spacing between the first through-hole and the last through-hole is large in the electrode wire inserting direction.

According to the present invention, a wire inserting method in a wire discharge processing for inserting an electrode wire through a plurality of through-holes formed in one or a plurality of workpieces comprises a pipe inserting step of inserting one pipe into all through-holes under the state where the plurality of through-holes are arranged on the same axis; a wire inserting step carried out after, or in parallel with, the pipe inserting step, for inserting the electrode wire through the pipe; and a pipe removing step of pulling out only the pipe from the through-holes after the wire insertion step.

According to the wire inserting method of the invention, one pipe is inserted through all the through-holes and the electrode wire is inserted into the pipe. Therefore, even when the spacing between the first through-hole and the last through-hole is large in the electrode wire inserting direction or when the diameter of the through-holes is small, the electrode wire can be reliably inserted through all the through-holes by inserting the pipe through all the through-holes. Consequently, the number of workpieces that can be processed by one wire discharge processing can be increased, and the processing time per workpiece can be reduced.

Here, when the pipe inserting step described above includes the step of arranging guide ports of a pipe guide in the space between the adjacent workpieces in a plurality of workpieces and inserting the pipe through the guide ports, positioning of the pipe can be made between the adjacent workpieces and the pipe inserted into the through-hole of one of the workpieces can be correctly guided to the through-hole of another workpiece.

When a taper surface the diameter of which decreases in the inserting direction of the pipe is formed on each guide port, the distal end of the pipe slides on the taper surface and is guided to the exit even when the center line of the pipe deviates from the center position of the guide port.

According to the present invention, a wire inserting apparatus in a wire discharge processing for inserting an electrode wire through a plurality of through-holes formed in one or a plurality of workpieces comprises one pipe which is inserted through all through-holes under the state where the plurality of through-holes are arranged on the same axis, into which the electrode is inserted and which is thereafter removed from the through-holes.

The wire inserting apparatus in the wire discharge processing according to this invention includes one pipe which is inserted through all the through-holes under the state where a plurality of through-holes are arranged on the same axis and into which the electrode wire is inserted. Therefore, even when the spacing between the first through-hole and the last through-hole is large in the electrode wire inserting direction or when the diameter of the through-holes is small, the electrode wire can be reliably inserted through all the through-holes by inserting the pipe through all the through-holes. Consequently, the number of workpieces that can be processed by one wire discharge processing can be increased, and the processing time per workpiece can be reduced.

When a pipe guide having guide ports is disposed and each guide port is arranged in the space between the adjacent workpieces among a plurality of workpieces so that the pipe can be inserted through the guide ports, positioning of the pipe can be made between the adjacent workpieces and the pipe inserted into the through-hole of one of the workpieces can be correctly guided to the through-hole 11 of another workpiece.

When a taper surface the diameter of which decreases in the inserting direction of the pipe is formed on each guide port, the distal end of the pipe slides on the taper surface and is guided to the exit even when the center line of the pipe deviates from the center position of the guide port.

The present invention may be more fully understood from the description of preferred embodiments of the invention set forth below, together with the accompanying drawings.

DECRIPTION OF THE PREFERRED EMBODIMENTS

A preferred embodiment of the invention will be hereinafter explained with reference to the accompanying drawings.

Figure 1:
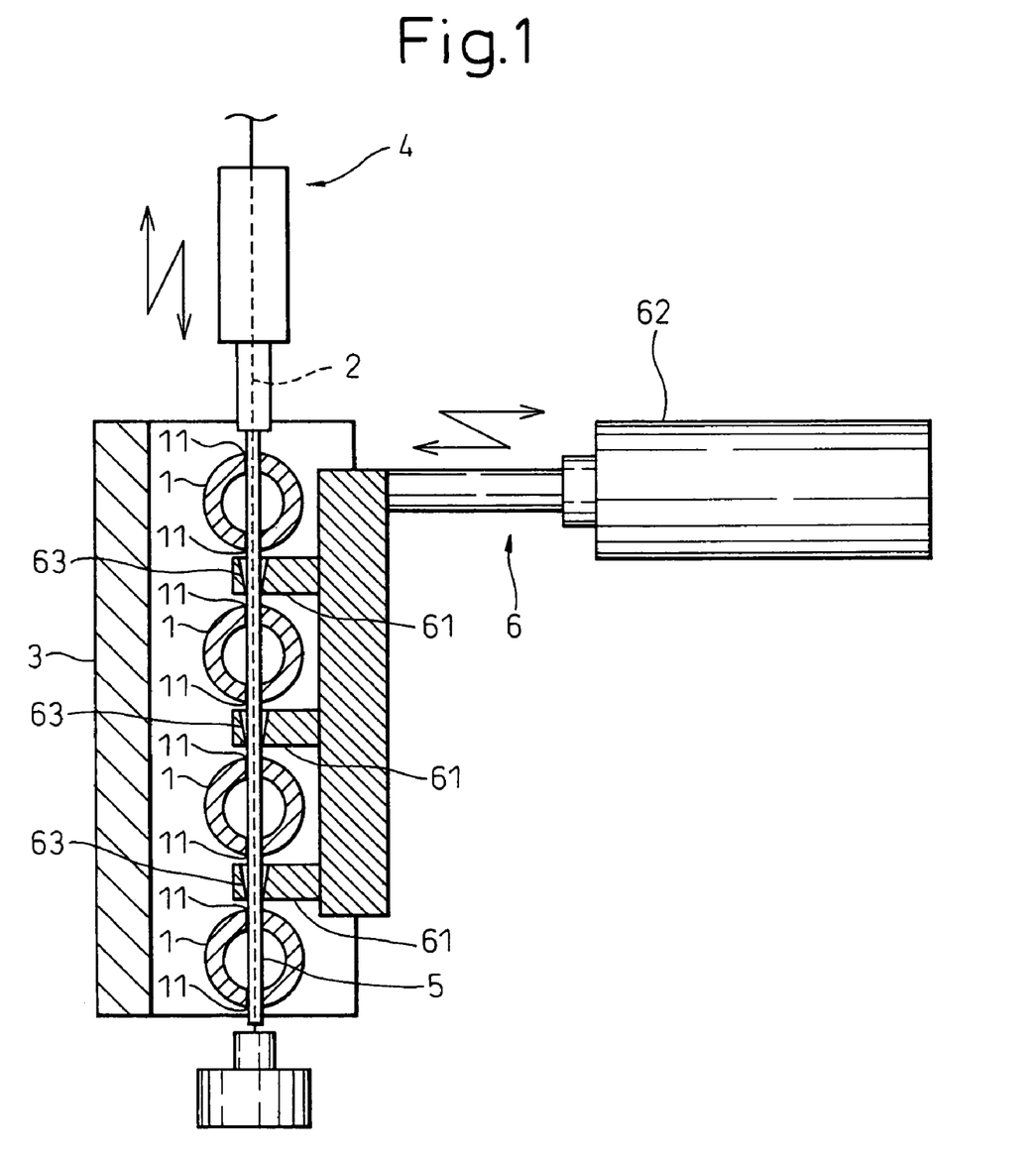
FIG. 1 is a side view of a wire discharge processing apparatus according to an embodiment of the invention and is also a sectional view taken along a line I-I of FIG. 2.
Figure 2:
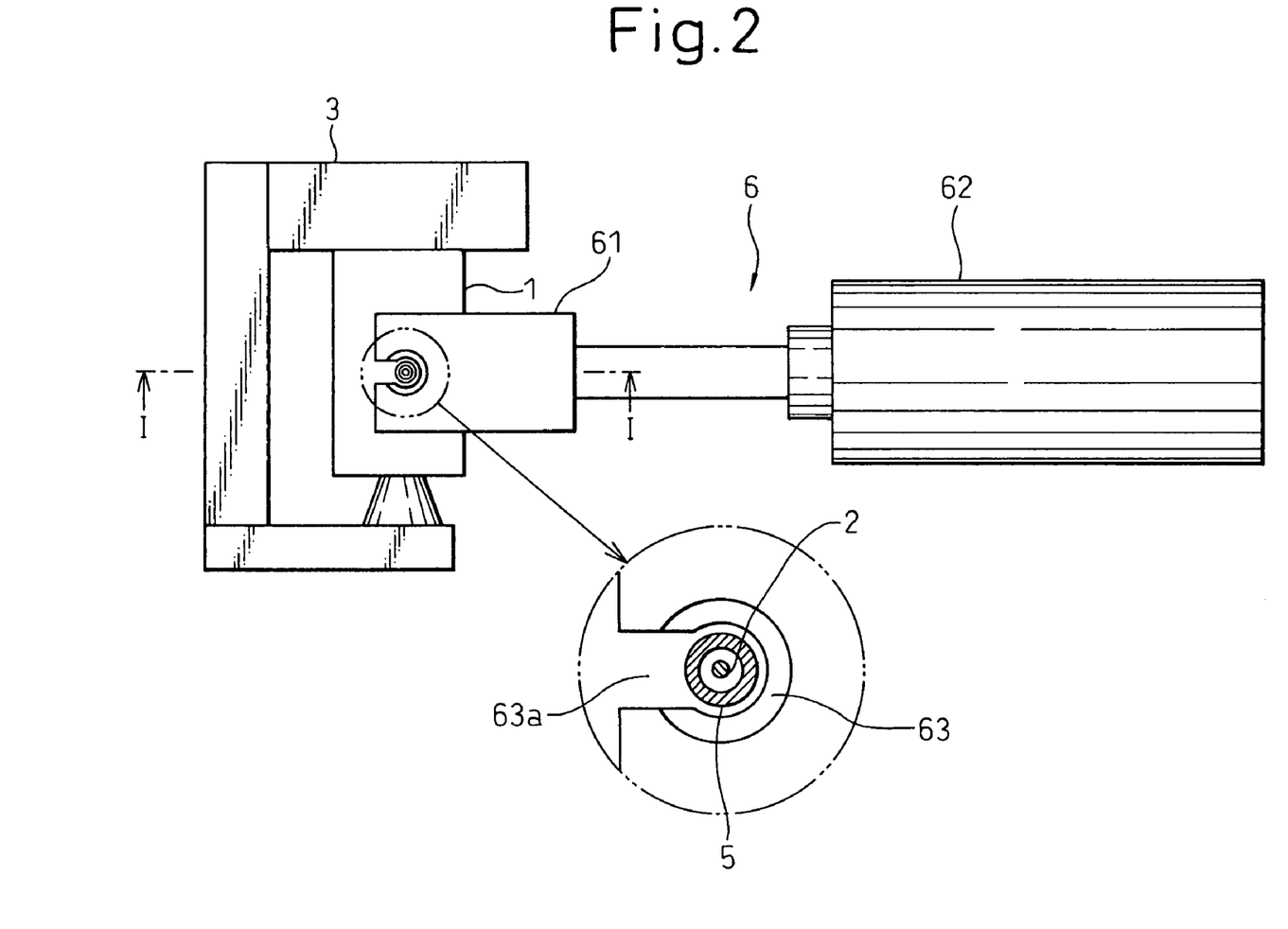
FIG. 2 is a plan view of the wire discharge processing apparatus.
Figure 3:
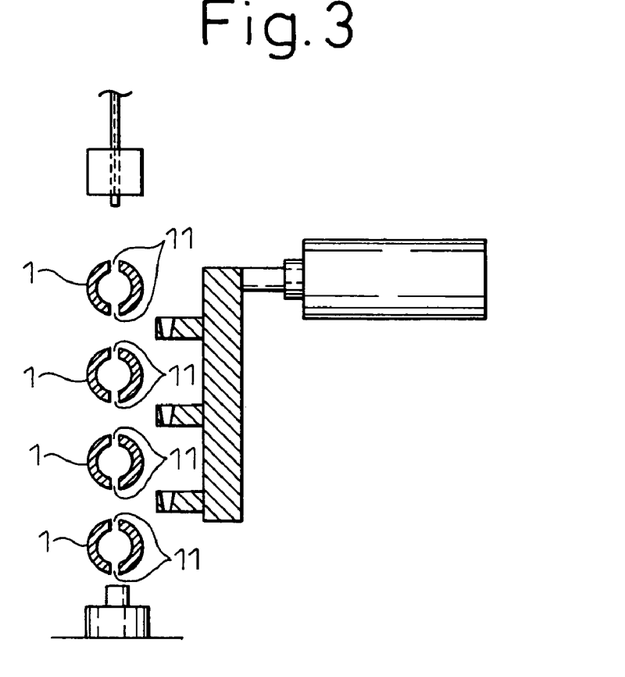
FIGS. 3 to 9 are explanatory views of operations of the wire discharge processing apparatus.

FIG. 1 is a side view of a wire discharge processing apparatus according to an embodiment of the invention, FIG. 2 is a plan view of the wire discharge processing apparatus and FIGS. 3 to 9 are explanatory views of operations of the wire discharge processing apparatus.

Referring to FIGS. 1 and 2, a workpiece 1 or an object to be processed has a through-hole 11 through which an electrode wire 4 is passed and to which wire discharge processing is applied. The wire discharge processing processes the through-hole 11 into various kinds of odd-shaped holes such as a trapezoidal shape, a diamond shape, a semi-circular shape, and so forth. In this embodiment, the workpiece 1 has a cylindrical shape. A concrete example of the workpiece 1 is a cylindrical housing of a fuel injection device for vehicles.

The wire discharge processing apparatus can simultaneously conduct the wire discharge processing for a plurality of workpieces 1 and all the workpieces 1 are fixed to a jig 3 while they are positioned on the same axis as shown in FIG. 1.

A wire/pipe elevation device 4 is arranged above the workpieces 1 fixed to the jig 3. The wire/pipe elevation device 4 inserts a pipe 5 through all the through-holes 11 of the plurality of workpieces 1 and inserts electrode wires 2 through the pipe 5.

A pipe guide 6 is arranged on the side of the workpieces 1 fixed to the jig 3. The pipe guide 6 includes a plurality of arms 61 arranged with predetermined gaps among them in a vertical direction and a cylinder 62 for driving the arms 61 in such a manner as to bring the arms 61 close to and away from the workpieces 1. A guide port 63 having a greater diameter than the outer diameter of the pipe 5 is formed at a distal end of each arm 61 and is constituted by a taper surface having a diameter that expands upward or decreases downward.

Next, the operation procedure of the wire inserting method in the wire discharge processing apparatus having the construction described above will be explained with reference to FIGS. 3 to 9. Incidentally, the jig is not shown in FIGS. 3 to 9.

(1) First, a plurality of workpieces 1 is fixed to a jig in such a manner that all the through-holes 11 of the plurality of workpieces 1 are positioned on the same axis.

Figure 4:
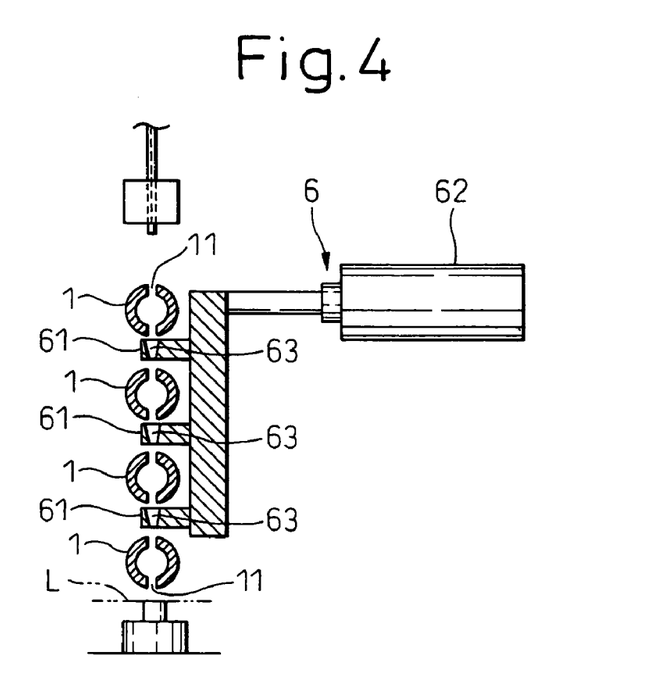

(2) Next, the cylinder 62 of the pipe guide 6 is driven, each arm 61 is inserted between the adjacent workpieces 1 and the guide port 63 at the distal end of the arm is brought into conformity with the axis of the through-hole 11 of each workpiece 1 as shown in FIG. 4.

Figure 5:
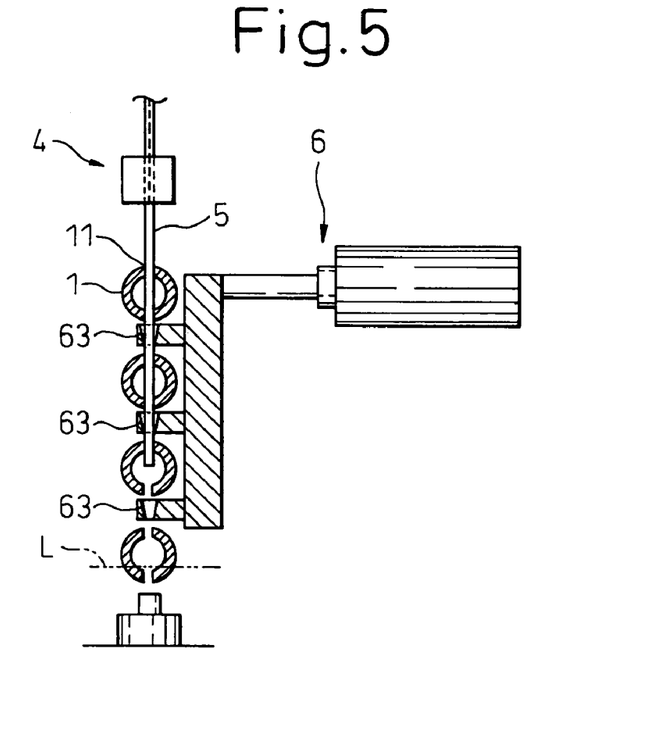

(3) The pipe 5 is moved down from immediately above the through-holes 11 of the workpieces 1 by the pipe/wire elevation device 4 and is inserted into all the through-holes 11 of the workpieces 1 as shown in FIG. 5. During this insertion operation, the guide ports 63 of the pipe guide 6 make positioning of the pipe 5 inside the space defined between the adjacent workpieces 1. Even when the center line of the pipe 5 deviates from the center position of the guide port 63, due to the taper surface of the guide port 63, the distal end of the pipe slides on the taper surface and is guided to the exit.

Figure 6:
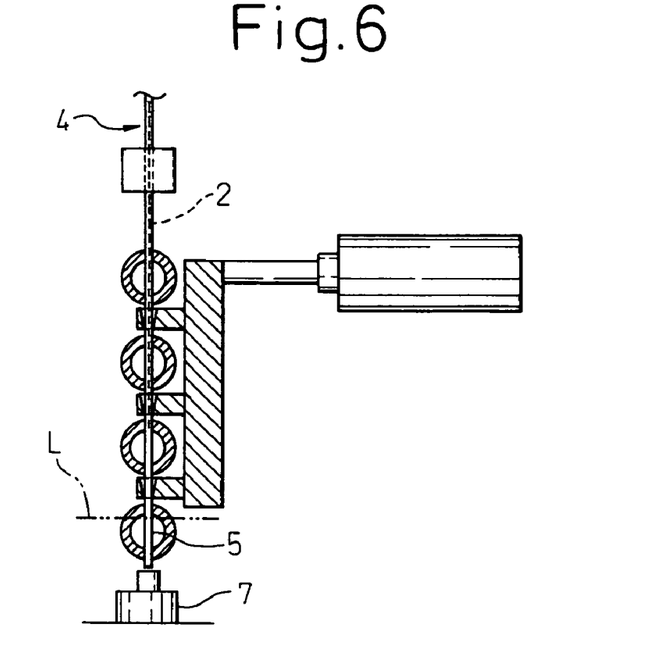

(4) Next, the electrode wire 2 is moved down inside the pipe 5 by the pipe/wire elevation device 4 as shown in FIG. 6.

Figure 7:
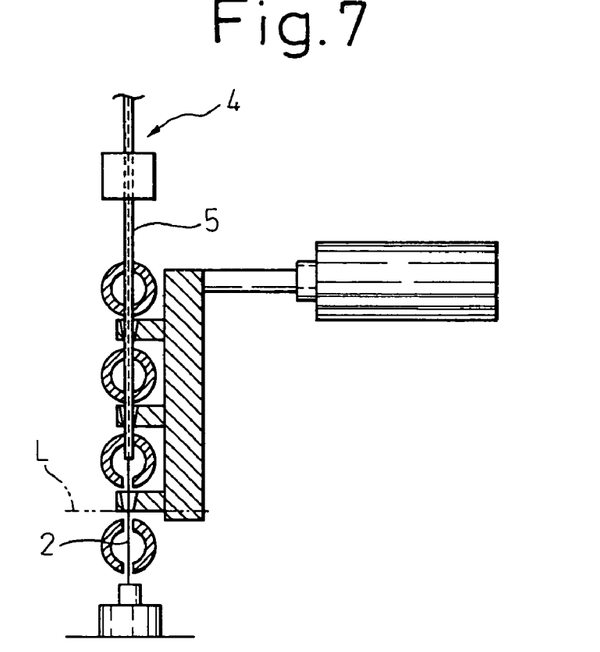
Figure 8:
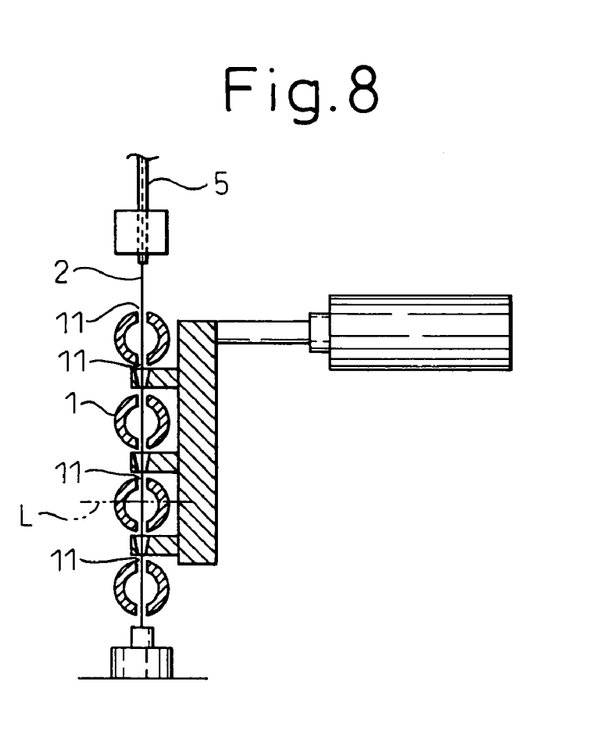

(5) After the distal end portion of the electrode wire 2 is fixed to a wire receiving jig 7, the pipe 5 is moved up by the pipe/wire elevation device 4 as shown in FIG. 7 and is then pulled out from all the through-holes 11 of the workpieces 1 as shown in FIG. 8.

Figure 9:
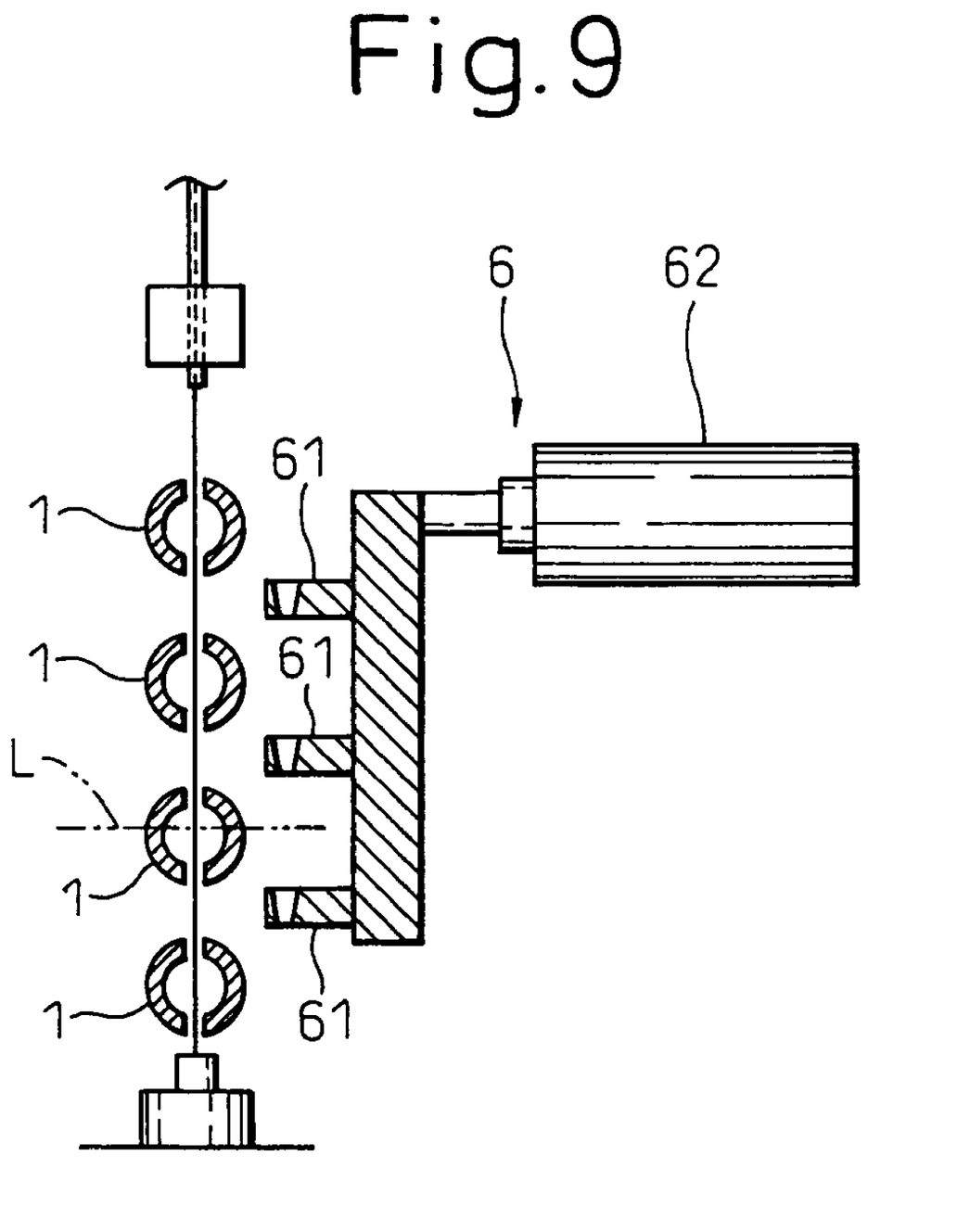

(6) The cylinder 62 of the pipe guide 6 is driven and each arm 61 is pulled out from between the adjacent workpieces 1 as shown in FIG. 9. During this arm removing operation, the arm 61 can move without interfering with the electrode wire 2 because a notch 63a is formed in the guide port 63 as shown in FIG. 2.

As a result of the operation procedure described above, the electrode wire 2 can be inserted through all the through-holes 11 of the workpieces 1 and inserting of the wire is complete. The operation of inserting the electrode wire 2 through the pipe 5 can be carried out in parallel with the operation of insertion of the pipe 5 through the through-holes 11. During a series of operations described above, the operation of charging a working fluid can be carried out in parallel as represented by a liquid level L indicated by two-dot-chain lines in FIGS. 4 to 9 and the cycle time can be shortened.

As explained above, the wire inserting method in the wire discharge processing according to this embodiment is a wire inserting method in a wire discharge processing for inserting the electrode wire 2 through a plurality of through-holes 11 formed in one or a plurality of workpieces 1, and includes a pipe insertion step of inserting one pipe 5 into all the through-holes 11 while the plurality of through-holes 11 are arranged on the same axis, a wire insertion step carried out after or in parallel with the pipe insertion step, for inserting the electrode wire 2 through the pipe 5, and a pipe removing step of pulling out only the pipe 5 from the through-holes 11 after the wire insertion step. The wire inserting apparatus in the wire discharge processing according to this embodiment is a wire inserting apparatus in a wire discharge processing for inserting an electrode wire 2 through a plurality of through-holes 11 formed in one or a plurality of workpieces 1, and includes one pipe 5 which is inserted through all the through-holes 11 under the state where a plurality of through-holes 11 are arranged on the same axis, into which the electrode wire 2 is inserted and which is thereafter removed from the through-holes 11.

According to this embodiment, one pipe 5 is inserted through all the through-holes 11 and the electrode wire 2 is inserted through the pipe 5. Therefore, even when the spacing between the first through-hole 11 and the last through-hole 11 is large in the electrode wire inserting direction or when the diameter of the through-holes 11 is small, the electrode wire 2 can be reliably inserted through all the through-holes 11 because the pipe 5 is inserted through all the through-holes 11. Consequently, the number of workpieces 1 that can be processed by one wire discharge processing can be increased, and the processing time per workpiece can be reduced.

Because the pipe inserting step includes the step of arranging the guide ports 63 of the pipe guide 6 in the space between the adjacent workpiece 1 in a plurality of workpieces 1 and inserting the pipe 5 through the guide ports 63, positioning of the pipe 5 can be made between the adjacent workpieces 1 and the pipe 5 inserted into the through-hole 11 of one of the workpieces 1 can be correctly guided to the through-hole 11 of another workpiece 1.

Because the taper surface the diameter of which decreases in the inserting direction of the pipe 5 is formed on each guide port 63, the distal end of the pipe slides on the taper surface and is guided to the exit even when the center line of the pipe 5 deviates from the center position of the guide port 63.

While the invention has been described by reference to specific embodiments chosen for purposes of illustration, it should be apparent that numerous modifications could be made thereto by those skilled in the art without departing from the basic concept and scope of the invention.

The invention claimed is:

1. A method for inserting an electrode wire, the method comprising:
   providing at least one workpiece having an annular wall;
   providing a plurality of through-holes in the at least one workpiece, each of the through-holes extending completely through the annular wall;
   axially aligning the plurality of through-holes in the at least one workpiece;
   inserting a single pipe into the plurality of through-holes in the at least one workpiece;
   inserting the electrode wire through the single pipe;
   removing only the pipe from the plurality of through-holes in the at least one workpiece; and
   arranging a guide port of a pipe guide in a space between adjacent workpieces of a plurality of workpieces;
   axially aligning the guide port with the plurality of through-holes; and
   inserting the single pipe into the guide port.

2. The method according to claim 1, further comprising:
   forming a tapered surface, the diameter of which decreases in the pipe inserting direction in the guide port.

3. The method according to claim 1, further comprising removing the guide port of the pipe guide from the space between the adjacent workpieces.

4. The method according to claim 1, wherein the step of inserting the single pipe includes inserting the single pipe sequentially into the plurality of through-holes in the at least one workpiece.

5. The method according to claim 1, wherein the step of axially aligning the plurality of through holes includes axially aligning at least one through-hole in each of a plurality of workpieces.

6. A method for inserting an electrode wire, the method comprising:
   providing at least one workpiece having an annular wall;
   providing a plurality of through-holes in the at least one workpiece, each of the through-holes extend mg completely through the annular wall;
   axially aligning the plurality of through-holes in the at least one workpiece;
   inserting a single pipe into the plurality of through-holes in the at least one workpiece;
   inserting the electrode wire through the single pipe;
   removing only the pipe from the plurality of through-holes in the at least one workpiece;
   arranging a guide port of a pipe guide in a space between adjacent workpieces of the plurality of workpieces;
   axially aligning the guide port with at least one through-hole in each of the plurality of workpieces; and
   inserting the single pipe into the guide; wherein
   the step of axially aligning the plurality of through holes includes axially aligning at least one through-hole in each of a plurality of workpieces.

7. A method for inserting an electrode wire, the method comprising:
   axially aligning a plurality of through-holes in at least one workpiece;
   inserting a single pipe into the plurality of through-holes in the at least one workpiece;
   inserting the electrode wire through the single pipe;
   processing each of the plurality of through-holes in the at least one workpiece simultaneously using a wire discharge process;
   removing only the pipe from the plurality of through-holes in the at least one workpiece;
   arranging a guide port of a pipe guide in a space between adjacent workpieces of a plurality of workpieces;
   axially aligning the guide port with the plurality of through-holes; and
   inserting the single pipe into the guide port.

8. The method according to claim 7, further comprising:
   forming a tapered surface, the diameter of which decreases in the pipe inserting direction in the guide port.

9. The method according to claim 7, further comprising removing the guide port of the pipe guide from the space between the adjacent workpieces.

10. The method according to claim 7, wherein the step of inserting the single pipe includes inserting the single pipe sequentially into the plurality of through-holes in the at least one workpiece.

11. The method according to claim 7, wherein the step of axially aligning the plurality of through holes includes axially aligning at least one through-hole in each of a plurality of workpieces.

12. A method for inserting an electrode wire, the method comprising:
    axially aligning a plurality of through-holes in at least one workpiece;
    inserting a single pipe into the plurality of through-holes in the at least one workpiece;
    inserting the electrode wire through the single pipe;
    processing each of the plurality of through-holes in the at least one workpiece simultaneously using a wire discharge process;
    removing only the pipe from the plurality of through-holes in the at least one workpiece;
    arranging a guide port of a pipe guide in a space between adjacent workpieces of the plurality of workpieces;
    axially aligning the guide port with the at least one through-hole in the plurality of workpieces; and
    inserting the single pipe into the guide; wherein
    the step of axially aligning the plurality of through holes includes axially aligning at least one through-hole in each of a plurality of workpieces.

13. A method for inserting an electrode wire, the method comprising:
    axially aligning a plurality of through-holes in at least one workpiece at spaced positions on a single axis;
    inserting a single pipe into the plurality of through-holes in the at least one workpiece;
    inserting the electrode wire through the single pipe;
    removing only the pipe from the plurality of through-holes in the at least one workpiece;
    arranging a guide port of a pipe guide in a space between adjacent workpieces of a plurality of workpieces;
    axially aligning the guide port with the plurality of through-holes; and
    inserting the single pipe into the guide port.

14. The method according to claim 13, further comprising:
    forming a tapered surface, the diameter of which decreases in the pipe inserting direction in the guide port.

15. The method according to claim 13, further comprising removing the guide port of the pipe guide from the space between the adjacent workpieces.

16. The method according to claim 13, wherein the step of inserting the single pipe includes inserting the single pipe sequentially into the plurality of through-holes in the at least one workpiece.

17. The method according to claim 13, wherein the step of axially aligning the plurality of through holes includes axially aligning at least one through-hole in each of a plurality of workpieces.

18. A method for inserting an electrode wire, the method comprising:

axially aligning a plurality of through-holes in at least one workpiece at spaced positions on a single axis;

inserting a single pipe into the plurality of through-holes in the at least one workpiece;

inserting the electrode wire through the single pipe;

removing only the pipe from the plurality of through-holes in the at least one workpiece;

arranging a guide port of a pipe guide in a space between adjacent workpieces of the plurality of workpieces;

axially aligning the guide port with the at least one through-hole in the plurality of workpieces; and     inserting the single pipe into the guide port; wherein     the step of axially aligning the plurality of through holes includes axially aligning at least one through-hole in each of a plurality of workpieces.

\* \* \* \* \*